United States Patent
Hulbert et al.

(10) Patent No.: US 9,501,085 B2
(45) Date of Patent: Nov. 22, 2016

(54) METHOD AND APPARATUS FOR PULSE GENERATION

(75) Inventors: Pete Hulbert, Cleveland, OH (US);
Michael Rayman, Akron, OH (US);
Trish Gottlob, Chagrin Falls, OH (US);
Rajat Mehta, Twinsburg, OH (US);
John Lilie, Solon, OH (US)

(73) Assignee: KEITHLEY INSTRUMENTS, LLC, Solon, OH (US)

( * ) Notice: Subject to any disclaimer, the term of this patent is extended or adjusted under 35 U.S.C. 154(b) by 1225 days.

(21) Appl. No.: 11/701,051

(22) Filed: Feb. 1, 2007

(65) Prior Publication Data

US 2008/0186065 A1    Aug. 7, 2008

(51) Int. Cl.
*G06F 1/04* (2006.01)
*G06F 1/02* (2006.01)

(52) U.S. Cl.
CPC .................... *G06F 1/022* (2013.01)

(58) Field of Classification Search
USPC ................. 327/141, 142, 291, 299
See application file for complete search history.

(56) References Cited

U.S. PATENT DOCUMENTS

| | | | | |
|---|---|---|---|---|
| 5,945,822 A | * | 8/1999 | Shiotsuka | 324/158.1 |
| 6,119,257 A | * | 9/2000 | Negishi | 714/738 |
| 6,545,513 B2 | * | 4/2003 | Tsuchida et al. | 327/108 |
| 6,636,124 B1 | * | 10/2003 | Liu | 332/109 |
| 7,023,153 B2 | * | 4/2006 | Kitazawa | 318/162 |
| 7,068,082 B2 | * | 6/2006 | Kojima | 327/108 |
| 2002/0080202 A1 | * | 6/2002 | Sekiguchi | 347/10 |

FOREIGN PATENT DOCUMENTS

| | | |
|---|---|---|
| JP | 64-36116 A | 2/1989 |
| JP | 10-319096 A | 12/1998 |
| JP | 11-95862 A | 4/1999 |
| JP | 2006-333272 A | 12/2006 |

\* cited by examiner

*Primary Examiner* — Long Nguyen
(74) *Attorney, Agent, or Firm* — Pearne & Gordon LLP

(57) ABSTRACT

A method and apparatus for generating a desired pulse waveform including: dividing the desired pulse waveform into a plurality of line segments; assigning to each line segment at least a segment identification, a segment initial value, and a segment duration to form a waveform description; providing the waveform description to a pulse generator. The pulse generator is operable to produce a waveform corresponding to the waveform description and to output the produced waveform.

6 Claims, 1 Drawing Sheet

METHOD AND APPARATUS FOR PULSE GENERATION

BACKGROUND OF THE INVENTION

The present invention relates to test instruments and, in particular, to the generation of pulse waveforms for testing.

The generation of testing signals for devices has become increasing important as testing has moved towards 100 percent testing, exhaustive multiple parameter testing and lifetime testing. All of these trends have created a need for easily selected and produced pulse waveforms. The desire waveforms may include multiple pulses, multi-level pulses or both.

It is known to generate such waveforms on a continuous point by point basis, but this requires substantial data storage and makes the control interface complicated. A quicker more efficient waveform generator is needed.

SUMMARY OF THE INVENTION

A method and apparatus for generating a desired pulse waveform including: dividing the desired pulse waveform into a plurality of line segments; assigning to each line segment at least a segment identification, a segment initial value, and a segment duration to form a waveform description; providing the waveform description to a pulse generator. The pulse generator is operable to produce a waveform corresponding to the waveform description and to output the produced waveform.

DESCRIPTION OF THE PREFERRED EMBODIMENTS

Figure 1:
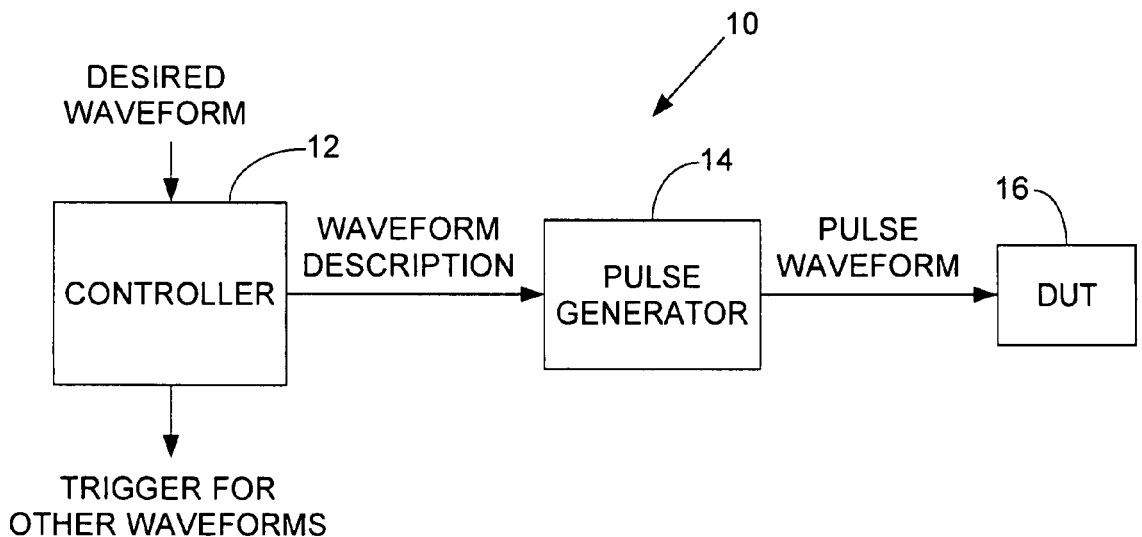
FIG. 1 is a block diagram of an example of a waveform generator according to the invention.

Referring to FIG. 1, a waveform generator 10 includes a controller 12 and a pulse generator 14. In operation, the waveform generator 10 supplies a pulse waveform to a device under test (DUT) 16. A desired waveform is input to the controller 12 and a waveform description corresponding thereto is provided by the controller 12 to the pulse generator 14. The pulse generator 14 then produces the pulse waveform according to the waveform description.

The pulse generator 14 may be, for example, a digitally controlled voltage source that is programmed to supply output signal waveforms in response to the waveform description. The controller 12 may be, for example, a general purpose computer, a programmable controller, a FPGA, or similar devices.

Figure 2:
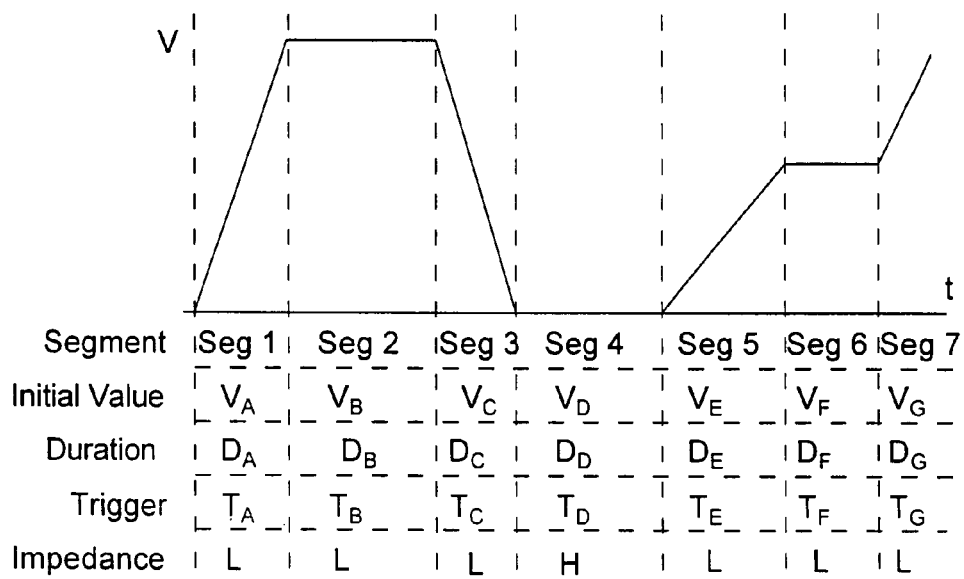
FIG. 2 is a graphical representation of an example of a waveform description according to the invention.

Referring to FIG. 2, an example desired waveform is shown. The waveform is divided into a series of line segments indicated by the broken lines. An example waveform description is listed below the desired waveform. For each line segment, there is at least a segment identification (e.g., Seg 1, Seg 2 . . . ), an initial value (e.g., $V_A$, $V_B$ . . . ) and a duration (e.g., $D_A$, $D_B$ . . . ). It is also possible to specify a final value for each segment, but using the initial value of the next segment is simpler.

The controller 12 may have stored waveform descriptions that are selected by a user or additional test control devices, based on a desired waveform input selection, or the controller 12 may create waveform descriptions as needed based on the input of desired input waveforms themselves. Also, combinations of stored and as-needed descriptions may be used.

The pulse generator 14 assembles each of the line segments in the waveform description into a pulse waveform for application to the DUT 16.

A segment may also include a trigger value (e.g., $T_A$, $T_A$ . . . ). The trigger values can be used to synchronize one or more additional desired pulse waveforms. For example, the trigger value may specify another waveform generator and when a segment in that waveform generator is to occur.

Additionally, during some test procedures, it may be desirable to not only have a zero output at some time from the waveform generator, but to actually appear at that time as being disconnected from the DUT 16. This can be simulated if the waveform generator 10 selectively presents a high impedance (e.g., an impedance comparable to being disconnected) to the DUT 16. To provide this functionality, each segment may also have an impedance state (e.g., L and H). If the state is H, the waveform generator 10 appears to be disconnected from the DUT 16. If the state is L, the DUT 16 sees the appropriate load impedance (e.g., 50 ohms).

The method and apparatus of the invention provides a simple control interface (e.g., tables of segments) which includes a convenient way of handling wide ranges of time bases (e.g., nanoseconds to multiple seconds)

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method for generating a pulse waveform, said method comprising:
   dividing a desired waveform into a plurality of line segments;
   describing each line segment by at least a segment identification, a segment initial value, and a segment duration to form a digital waveform description;
   providing said digital waveform description to a digitally controlled pulse generator, said digitally controlled pulse generator being operable to produce a waveform corresponding to said digital waveform description in response to said digital waveform description; and
   outputting said produced waveform.

2. A method according to claim 1, wherein each line segment description is further assigned a trigger value, said trigger value being operable to synchronize another pulse waveform.

3. A method according to claim 1, wherein each line segment description is further assigned an impedance state, said impedance state permitting a simulation of said pulse generator being disconnected from an output connection.

4. A waveform generator for generating a pulse waveform, said waveform generator comprising:
   a digitally controlled pulse generator; and
   a controller, said controller:
      dividing said desired waveform into a plurality of line segments;
      describing each line segment by at least a segment identification, a segment initial value, and a segment duration to form a digital waveform description; and
      providing said digital waveform description to said digitally controlled pulse generator, said digitally controlled pulse generator being operable to produce an output corresponding to said digital waveform description in response to said digital waveform description, whereby said pulse waveform is output.

5. A waveform generator according to claim 4, wherein each line segment description is further assigned a trigger value, said trigger value being operable to synchronize another pulse waveform.

6. A waveform generator according to claim 4, wherein each line segment description is further assigned an impedance state, said impedance state permitting a simulation of said waveform generator being disconnected from an output connection.

* * * * *